United States Patent [19]

Tanaka et al.

[11] Patent Number: 4,856,813
[45] Date of Patent: Aug. 15, 1989

[54] VEHICLE SUSPENSION APPARATUS

[75] Inventors: Tadao Tanaka; Mitsuhiko Harara, both of Okazaki; Yasutaka Taniguchi, Nagoya; Shozo Takizawa; Minoru Tatemoto, both of Okazaki; Tetsuya Terada, Nagoya; Shunichi Wada, Himeji; Shigeki Ohtagaki, Himeji; Kouji Mitsuhata, Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 255,778

[22] Filed: Oct. 11, 1988

[30] Foreign Application Priority Data

Oct. 15, 1987 [JP] Japan .............................. 62-260468

[51] Int. Cl.$^4$ .................................................. B60G 3/00
[52] U.S. Cl. ..................................... 280/703; 280/707
[58] Field of Search ............. 280/703, 707, 840, 6.12, 280/DIG. 1

[56] References Cited

U.S. PATENT DOCUMENTS 4,625,992 12/1986 Tamara et al. .................... 280/703
4,640,526 2/1987 Tanaka et al. ................ 280/DIG. 1
4,761,022 8/1988 Ohashi et al. ..................... 280/703
4,765,649 8/1988 Ikemoto et al. .................... 280/703

Primary Examiner—Kenneth R. Rice
Attorney, Agent, or Firm—Hedman, Gibson, Costigan & Hoare

[57] ABSTRACT

If a deceleration exeeds first set value G1 within set time T1 after the brake is depressed, a set amount of fluid is supplied to the fluid spring chamber of each front-wheel suspension unit. If a deceleration exceeds the second set value G2 when set time T1 or more has elapsed upon this operation, a set amount of fluid is exhausted from the fluid spring chamber of each rear-wheel suspension unit. With this operation, since braking action for gradually increasing a deceleration is controlled by two stages, uncomfortableness which passangers feel in anti-nose-dive control can be greatly reduced. In addition, control is not performed only by depressing the brake pedal if an acutal deceleration is smaller than first set value G1. Even when a deceleration exceeds first set value G1 upon depression of the brake pedal, if the time when the deceleration exceeds first set value G1 exceeds set time T1, it is determined that a gradual braking operation is performed, so that only control for increasing a damping force is performed.

5 Claims, 5 Drawing Sheets

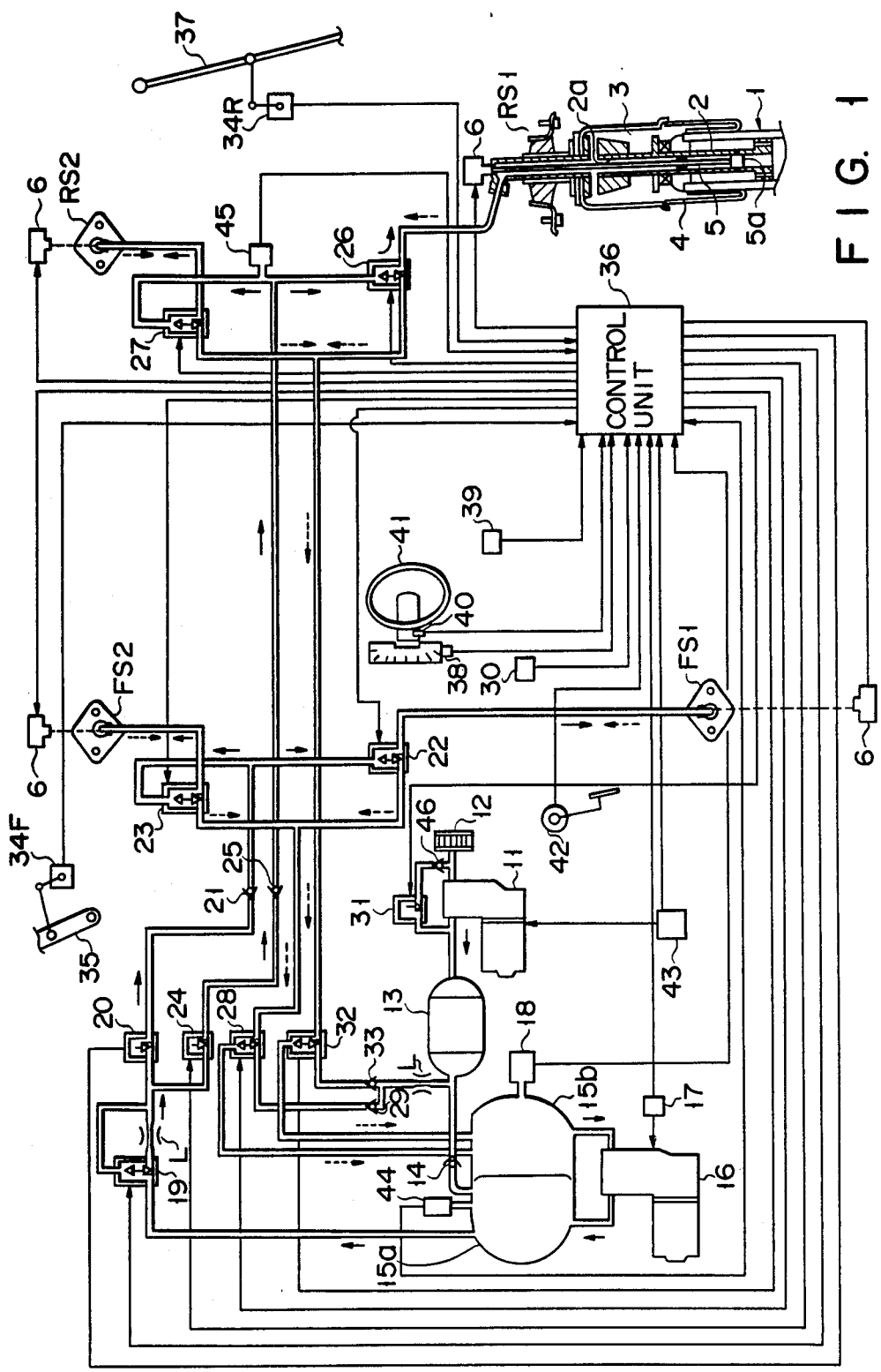

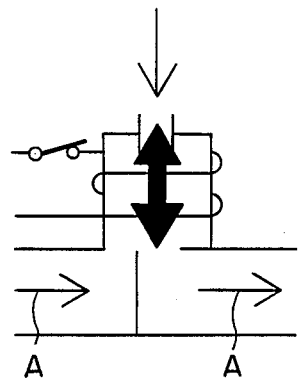
F I G. 2A
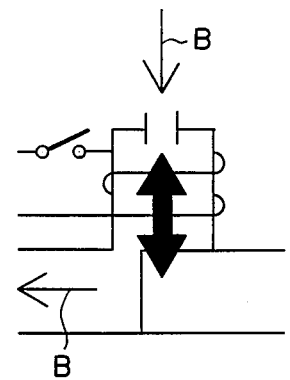
F I G. 2B
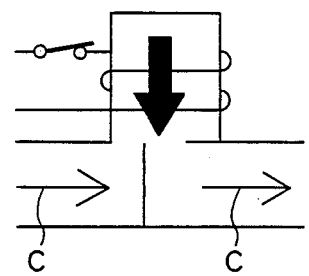
F I G. 3A
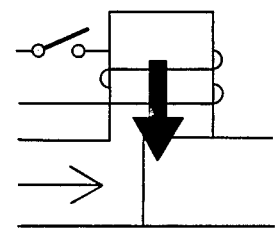
F I G. 3B

VEHICLE SUSPENSION APPARATUS

BACKGROUND OF THE INVENTION

1. Field of the Invention

The present invention relates to a vehicle suspension apparatus and, more specifically, to an improvement in suspension for reducing a nose dive generated in a vehicle body especially when the vehicle is braked.

2. Description of the Related Art

Japanese Utility Model Disclosure (Kokai) No. 60-119631 discloses a conventional suspension apparatus for reducing a nose dive generated in a vehicle body by supplying a fluid to front-wheel fluid spring chambers while exhausting a fluid from rear-wheel fluid spring chambers when the deceleration of the vehicle is large. In such a suspension apparatus, since compressed air is consumed every time control for reducing a nose dive is performed, the operation frequency of a compressor is increased. As a result, durability of the compressor is degraded. In addition, since the control is performed in the same manner regardless of the magnitude of a deceleration in a braking operation, passengers may feel uncomfortable.

Japanese Patent Disclosure (Kokai) No. 61-44014, therefore, discloses a suspension apparatus which is designed to perform two-stage supply/exhaust air control when a brake pedal is depressed and when a deceleration exceeds a set value.

In this apparatus, however, since the first stage control is performed when the brake pedal is depressed, a vehicle position error may occur by unnecessary control or durability of each part may be degraded.

SUMMARY OF THE INVENTION

It is an object of the present invention to enable multistage control without making passengers feel uncomfortable and to prevent degradation in durability of each part due to unnecessary control.

According to the present invention, there is provided a vehicle suspension apparatus, comprising front and rear suspensions, each having a fluid spring chamber, for supporting front and rear wheels, a fluid supply unit for supplying a fluid to the fluid spring chambers through front- and rear-wheel supply valves, a fluid exhaust unit for exhausting the fluid from the fluid spring chambers through front- and rear-wheel exhaust valves, brake operation detecting means for detecting an operation state of brake operating means, deceleration detecting means for detecting a deceleration of a vehicle, and control means for outputting a first control signal for opening the front-wheel supply valves for a set control time when the brake operation detecting means and the deceleration detecting means detect that the brake operating means is operated and a deceleration exceeds a first set value within a first set time from a timing at which the brake operating means is started, outputting a second control signal for opening the rear-wheel exhaust valves for a set control time when the brake operation detecting means and the deceleration detecting means detect after the above operation that while the brake operating means is operated, the deceleration of the vehicle exceeds a second set value which is larger than the first set value, and outputting a third control signal to the front- and rear-wheel supply valves so as to return a fluid amount in each of the fluid spring chambers to a value prior to a control operation when the brake operation detecting means detect after that above operation that the brake operating means is set in an inoperative state, or when the deceleration detecting means detect after the above operation that the deceleration of the vehicle becomes smaller than a third set value which is substantially equal to or smaller than the first set value.

According to the present invention, if a deceleration exceeds first set value G1 within set time T1 after the brake is depressed, a set amount of fluid is supplied to the fluid spring chamber of each front-wheel suspension unit. If a deceleration exceeds the second set value G2 when set time T1 or more has elapsed upon this operation, a set amount of fluid is exhausted from each rear-wheel fluid spring chamber. With this operation, since braking action for gradually increasing a deceleration is controlled by two stages, uncomfortableness which passengers feel in anti-nose-dive control can be greatly reduced. In addition, control is not performed only by depressing the brake pedal if an actual deceleration is smaller than first set value G1. Even when a deceleration exceeds first set value G1 upon depression of the brake pedal, if the time when the deceleration exceeds first set value G1 exceeds set time T1, it is determined that a gradual braking operation is performed, so that only control for increasing a damping force is performed. When a deceleration is larger than the first set value G1 and smaller than the second set value G2, only a set amount of fluid is supplied to fluid spring chamber of the front-wheel suspension unit. Therefore, consumption of energy can be decreased, and durability of each part can be improved, thereby obtaining a vehicle suspension apparatus which is very effective in practical use.

BRIEF DESCRIPTION OF THE DRAWINGS

FIG. 1 a view showing an arrangement of a vehicle suspension apparatus according to an embodiment of the present invention;

FIGS. 2A and 2B are views for explaining an operation of each three-way valve in FIG. 1;

FIGS. 3A and 3B are views for explaining an operation of each switching valve in FIG. 1.

DETAILED DESCRIPTION OF THE PREFERRED EMBODIMENT

Figure 4:
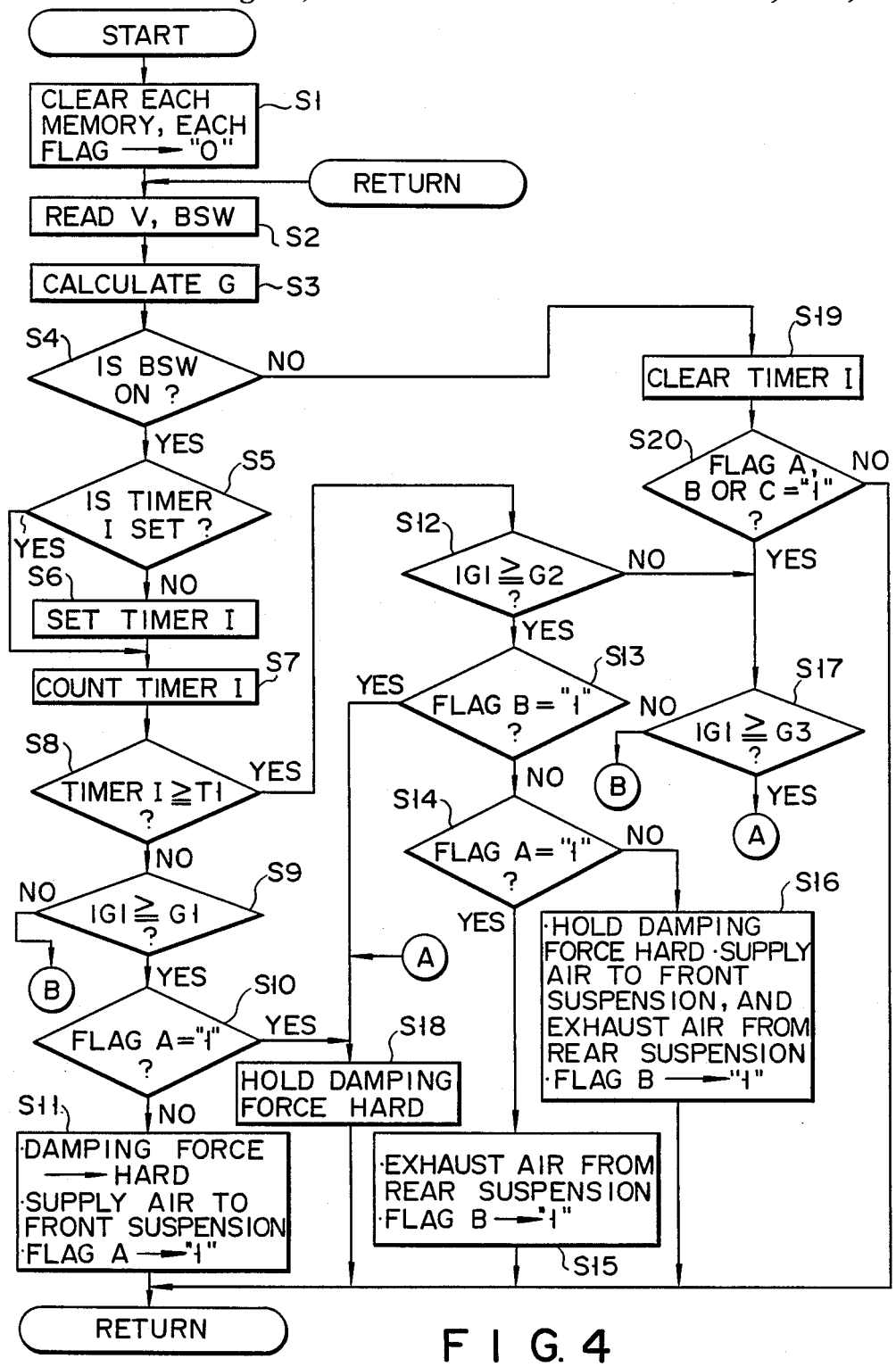
FIGS. 4 and 5 are flow charts showing an operation of control unit 36 in FIG. 1.

An embodiment of the present invention will be described below with reference to the accompanying drawings.

Referring to FIG. 1, reference symbol FS1 denotes a suspension unit at the front left wheel side; FS2, a suspension unit at the front right wheel side; RS1, a suspension unit at the rear left wheel side; and RS2, a suspension unit at the rear right wheel side. Since suspension units FS1, FS2, RS1, and RS2 have the same structure, the suspension unit will be represented by reference symbol S hereinafter except that the suspensions for front and rear wheels or left and right wheels are independently explained.

Suspension unit S includes shock absorber 1. Absorber 1 includes a cylinder mounted on a wheel and piston rod 2 having a piston slidably fitted in the cylinder and supported on a vehicle body at its upper end. Unit S includes air spring chamber 3 formed coaxially with rod 2 above absorber 1 and having a vehicle height adjusting function. Part of chamber 3 is formed by bellows 4. Therefore, by supplying/exhausting air to/from chamber 3 through path 2a formed in rod 2, the vehicle height can be increased or decreased.

Control rod 5 having valve 5a for adjusting a damping force at its lower end is arranged in piston rod 2. Control rod 5 is rotated by actuator 6 mounted at the upper end of piston rod 2 to drive valve 5a.

Compressor 11 compresses air fed from air cleaner 12 and supplies the air to high-pressure reserve tank 15a through dryer 13 and check valve 14. That is, since compressor 11 compresses air fed from cleaner 12 and supplies the air to dryer 13, the compressed air dried by silica gel or the like in dryer 13 is received in tank 15a. An inlet port of compressor 16 is connected to low-pressure reserve tank 15b, and its outlet port is connected to high-pressure reserve tank 15a. Reference numeral 18 denotes a pressure switch which is turned on when the pressure in tank 15b exceeds a first set value (e.g., the atmospheric pressure). When switch 18 outputs an ON signal, compressor 16 is driven by compressor relay 17 which is turned on by a signal from control unit 36 (to be described later). Therefore, the pressure in tank 15b is always maintained below the first set value.

Air is supplied from tank 15a to each suspension unit S as indicated by solid arrows in FIG. 1. That is, the compressed air in tank 15a is supplied to suspension units FS1 and FS2 through supply flow amount control valve 19, front supply solenoid valve 20, check valve 21, front left solenoid valve 22, and front right solenoid valve 23. Similarly, the compressed air in tank 15a is supplied to suspension units RS1 and RS2 through control valve 19, rear supply solenoid valve 24, check valve 25, rear left solenoid valve 26, and rear right solenoid valve 27. Note that supply flow amount control valve 19 can be set to a first position (ON state) where the compressed air to be supplied to each suspension unit S passes through small-diameter path L or to a second position (OFF state) where the air passes through a large-diameter path.

Air is exhausted from each unit S as indicated by broken arrows in FIG. 1. That is, the compressed air in units FS1 and FS2 is exhausted to tank 15b through solenoid valves 22 and 23 and exhaust direction change valve 28 comprising a three-way valve or is exhausted in the atmosphere through solenoid valves 22 and 23, change valve 28, check valve 29, dryer 13, exhaust solenoid valve 31, check valve 46 and air cleaner 12. Similarly, the compressed air in units RS1 and RS2 is exhausted to tank 15b through solenoid valves 26 and 27 and exhaust direction change valve 32 or is exhausted in the atmosphere through solenoid valves 26 and 27, change valve 32, check valve 33, dryer 13, exhaust solenoid valve 31, check valve 46, and air cleaner 12. Note that small-diameter path L having a diameter which is smaller than a diameter of paths connecting change valves 28 and 32 to tank 15b is formed between check valves 29 and 33 and dryer 13.

Each of solenoid valves 19, 22, 23, 26, 27, 28, and 32 allows an air flow indicated by arrows A in FIG. 2A when it is ON (energized) and allows an air flow indicated by arrows B in FIG. 2B when it is OFF (deenergized). Each of valves 20, 24, and 31 allows an air flow as indicated by arrows C in FIG. 3A when it is ON (energized) and inhibits an air flow as shown in FIG. 3B when it is OFF (deenergized).

Reference numeral 34F denotes a front vehicle height sensor, mounted between lower arm 35 of the front right suspension of the vehicle and the vehicle body, for detecting a front vehicle height; and 34R, a rear vehicle height sensor, mounted between lateral rod 37 of the rear left suspension of the vehicle and the vehicle body, for detecting a rear vehicle height. Signals detected by sensors 34F and 34R are supplied to control unit 36. Note that control unit 36 comprises a microcomputer, memories, a timer, an output circuit for driving valves, and an input circuit for reading outputs from switches and sensors (all of which are not shown).

Reference numeral 38 denotes a vehicle velocity sensor, incorporated in a speedometer, for supplying a detected vehicle velocity signal V to unit 36; 39, an acceleration sensor for detecting an acceleration acting on a vehicle body and supplying a detected acceleration signal to unit 6; 30, a brake switch (BSW) serving as a brake operation sensor for detecting the depressed state of a brake pedal (not shown), which is turned on when the brake pedal is depressed; 40, a steering wheel sensor for detecting the rotational speed of steering wheel 41, i.e., a steering angular velocity; and 42, an accelerator opening sensor for detecting the depression angle of an accelerator pedal for an engine (not shown). Signals detected by sensors 30, 40, and 42 are supplied to control unit 36. Reference numeral 43 denotes a compressor relay, controlled by a control signal from control unit 36, for driving compressor 11; and 44, a pressure switch which is turned on when the pressure in high-pressure reserve tank 15a is reduced below a second set value (e.g., 7 kg/cm$^2$). A signal from switch 44 is supplied to unit 36. When the pressure in tank 15a is reduced below the set value and pressure switch 44 is turned on, control unit 36 outputs a signal to compressor relay 43 so as to drive compressor 11. With this operation, the pressure in tank 15a is always maintained above the second set value. Note that even if pressure switch 44 is turned on, unit 36 inhibits driving of compressor 11 when pressure switch 18 is kept on, i.e., compressor 16 is kept driven. Reference numeral 45 denotes a pressure sensor, arranged in a path connecting solenoid valves 26 and 27, for detecting internal pressures of rear suspension units RS1 and RS2.

Each of solenoid valves 19, 20, 22, 23, 24, 26, 27, 28, 31, and 32 is controlled in accordance with a control signal from control unit 36.

An operation of the apparatus having the above arrangement according to the embodiment will be described below.

This apparatus has a vehicle height adjusting function and a position control function.

The vehicle height adjusting function for adjusting a vehicle height will be described first.

Control unit 36 compares vehicle heights detected by vehicle height sensors 34F and 34R with target vehicle heights set in the memory of unit 36. If it determines that each detected vehicle height is larger than the corresponding target vehicle height, it turns on solenoid valves 22, 23, 26, and 27, exhaust solenoid valve 31, and exhaust direction change valve 32 to lower the vehicle height. When unit 36 determines that the vehicle height is smaller than the target vehicle height, it turns on flow amount control valve 19 and supply solenoid valves 20 and 24 to increase the vehicle height.

The position control function for suppressing changes in position of the vehicle will be described below.

When steering wheel 41 is steered clockwise, the vehicle body tends to roll counterclockwise. In response to this operation, control unit 36 keeps supply solenoid valves 20 and 24 ON for a set time, and at the same time, turns on right-wheel solenoid valves 23 and 27 and turns on exhaust direction change valve 28, 22 after the set time has elapsed. With this operation, a set amount of compressed air is supplied from high-pressure reserve tank 15a to air spring chambers 3 of suspension units FS1 and RS1 on the left side, and a set amount of compressed air is exhausted from air spring chambers 3 of suspension units FS2 and RS2 on the right side to low-pressure reserve tank 15b. As a result, displacement of the vehicle, i.e., a counterclockwise roll is suppressed. This state, i.e., the state wherein a set amount of compressed air is supplied to air spring chambers 3 of suspension units FS1 and RS1 on the left side while a set amount of compressed air is exhausted from air spring chambers 3 of suspension units FS2 and RS2 on the right side is maintained. When turning is shifted to straight traveling, and control unit 36 detects that steering is set neutral by using steering sensor 40 or detects that a lateral acceleration becomes small by using acceleration sensor 39, unit 36 turns off solenoid valves 23 and 27. At the same time, unit 36 turns off exhaust direction change valve 28, 32. With this operation, the pressures in the air spring chambers of the respective suspension units on the right and left sides are kept to be equal to each other as in the case before the control is started.

When steering wheel 41 is steered counterclockwise, the vehicle body tends to roll clockwise. In response to this operation, unit 36 keeps supply solenoid valves 20 and 24 ON for a set time, and at the same time, turns on left-wheel solenoid valves 22 and 26. In addition, after the set time has elapsed, unit 36 turns on change valve 32. As a result, a set amount of compressed air is supplied from high-pressure reserve tank 15a to air spring chambers 3 of suspension units FS2 and RS2 on the right side, and at the same time, a set amount of compressed air is exhausted from air spring chambers 3 of suspension units FS1 and RS1 on the left side to low-pressure reserve tank 15b. With this operation, the displacement of the vehicle, i.e., a clockwise roll, is suppressed. Subsequently, the vehicle is controlled in the same manner as in the case wherein steering wheel 41 is steered clockwise.

An operation of position control for suppressing a squat will be described. A squat is a phenomenon in which a front portion of a vehicle floats while its rear portion sinks when the vehicle is started/accelerated because of an acceleration acting on the vehicle body. When it is detected that the vehicle is quickly accelerated by using accelerator opening sensor 42 or acceleration sensor 39, unit 36 turns on solenoid valve 24 for a set time, and at the same time, turns off front wheel solenoid valves 22 and 23. In addition, after the set time has elapsed, unit 36 turns on change valve 28. As a result, a set amount of compressed air is exhausted from front-wheel suspension units FS1 and FS2 to tank 15b, and at the same time, a set amount of compressed air is supplied from tank 15a to rear-wheel suspension units RS1 and RS2. The squat is controlled in this manner. This state is continued until the acceleration is decreased. When unit 36 detects that the quick acceleration is decreased by using accelerator opening sensor 42, acceleration sensor 39, or the like after this operation, control unit 36 keeps supply solenoid valve 20 and rear-wheel solenoid valves 26 and 27 ON for a set time, and at the same time, turns off front-wheel solenoid valves 22 and 23. As a result, a set amount of compressed air is supplied from tank 15a to front-wheel suspension units FS1 and FS2 while a set amount of compressed air is exhausted from rear-wheel suspension units RS1 and RS2 to tank 15b. With this operation, the air spring chambers of the respective suspension units S are returned to the state before the control is started.

An operation of position control for suppressing a nose dive will be described in accordance with flow charts shown in FIGS. 4 and 5. A nose dive is a phenomenon in which a front portion of a vehicle sinks upon braking because of a negative acceleration acting on the vehicle body.

In step S1, control unit 36 performs initialization, i.e., clears each memory, timer, and flag. In step S2, vehicle velocity V detected by vehicle velocity sensor 38 and the state of brake switch 30 are read and stored in a predetermined memory incorporated in unit 36. In step S3, deceleration G of the vehicle is calculated on the basis of vehicle velocity V stored in the memory and is stored in a predetermined memory incorporated in unit 36. It is judged in step S4 whether the brake switch 30 is turned on. If "YES" is obtained in step S4, the flow advances to step S5, and whether timer I incorporated in unit 36 is set or not is judged. If "NO" is obtained in step S5, the flow advances to step S6, and timer I is set. When processing in step S6 is completed or "YES" is obtained in step S5, the flow advances to step S7, and timer I is incremented. In addition, the flow advances to step S8 to judge whether the count value of timer I is larger than set time T1 (e.g., 0.4 seconds). This set time T1 is set to be equal to or slightly smaller than a time interval from a timing at which the brake pedal is depressed to a timing at which a nose dive is generated in the vehicle body. If "NO" is obtained in step S8, the flow advances to step S9, and whether the absolute value of the deceleration G stored in the memory is larger than first set value G1 (0.2 G) is judged. If "YES" is obtained in step S9, the flow advances to step S10, and unit 37 judges whether internal flag A is "1" or not. If "NO" is obtained in step S10, the flow advances to step S11, and control unit 36 keeps front-wheel supply solenoid valve 20 ON for a set time (e.g., 0.1 seconds) and outputs a control signal for increasing a damping force to each actuator 6. At the same time, "1" is set in flag A. After processing in step S11 is completed, the flow returns to step S2 again.

On the contrary, if "YES" is obtained in step S8, i.e., brake switch 30 is kept on for a period of time longer than time T1, the flow advances to step S12, and whether the absolute value of the deceleration G stored in the memory is larger than second set value G2 (e.g., 0.5 G) is judged. If "YES" is obtained in step S12, the flow advances to step S13, and unit 36 judges whether internal flag B is "1" or not. If "NO" is obtained in step S13, the flow advances to step S14 to judge whether flag A is "1". If "YES" is obtained in step S14, the flow advances to step S15, and unit 36 keeps rear-wheel solenoid valves 26 and 27 ON for a set time (e.g., 0.1 second) and updates flag B to "1". If "NO" is obtained in step S14, the flow advances to step S16, and unit 36 keeps front-wheel supply valve 20 and rear-wheel solenoid valves 26 and 27 ON for a set time (e.g., 0.1 second) and outputs a control signal for increasing a damping force to each actuator 6. At the same time, unit 36 updates flag B to "1". When processing in step 15 or 16 is complete, the flow returns to step S2.

In contrast to this, if "NO" is obtained in step S12, i.e., the absolute value of the deceleration G is smaller than second set value G2 after timer I is incremented to a value exceeding T1, the flow advances to step S17, and whether the absolute value of the deceleration G stored in the memory is larger than third set value G3 is judged. If "YES" is obtained in step 17, the flow advances to step S18 again. Note that if "YES" is obtained in step S10 or S13, the flow advances to step S18, and a control signal for increasing a damping force is output to each actuator 6. In this case, if the damping force has been already increased, this increase is simply confirmed.

If "NO" is obtained in step S4, i.e., the brake pedal is not depressed, the flow advances to step S19, and timer I is cleared. In addition, the flow advances to step S20 to judge whether flags A, B, and C are set to "1", i.e., processing in step S11, S15, or S16 is performed. If "NO" is obtained in step S20, i.e., no processing in steps S11, S15, and S16 is executed, the flow returns to step S2. If "YES" is obtained in step S20, the flow advances to step S17. In step S17, it is judged whether the deceleration exceeds third set value G3 (0.2 G). If "YES" is obtained in step S17, the flow advances to step S18.

Figure 5:
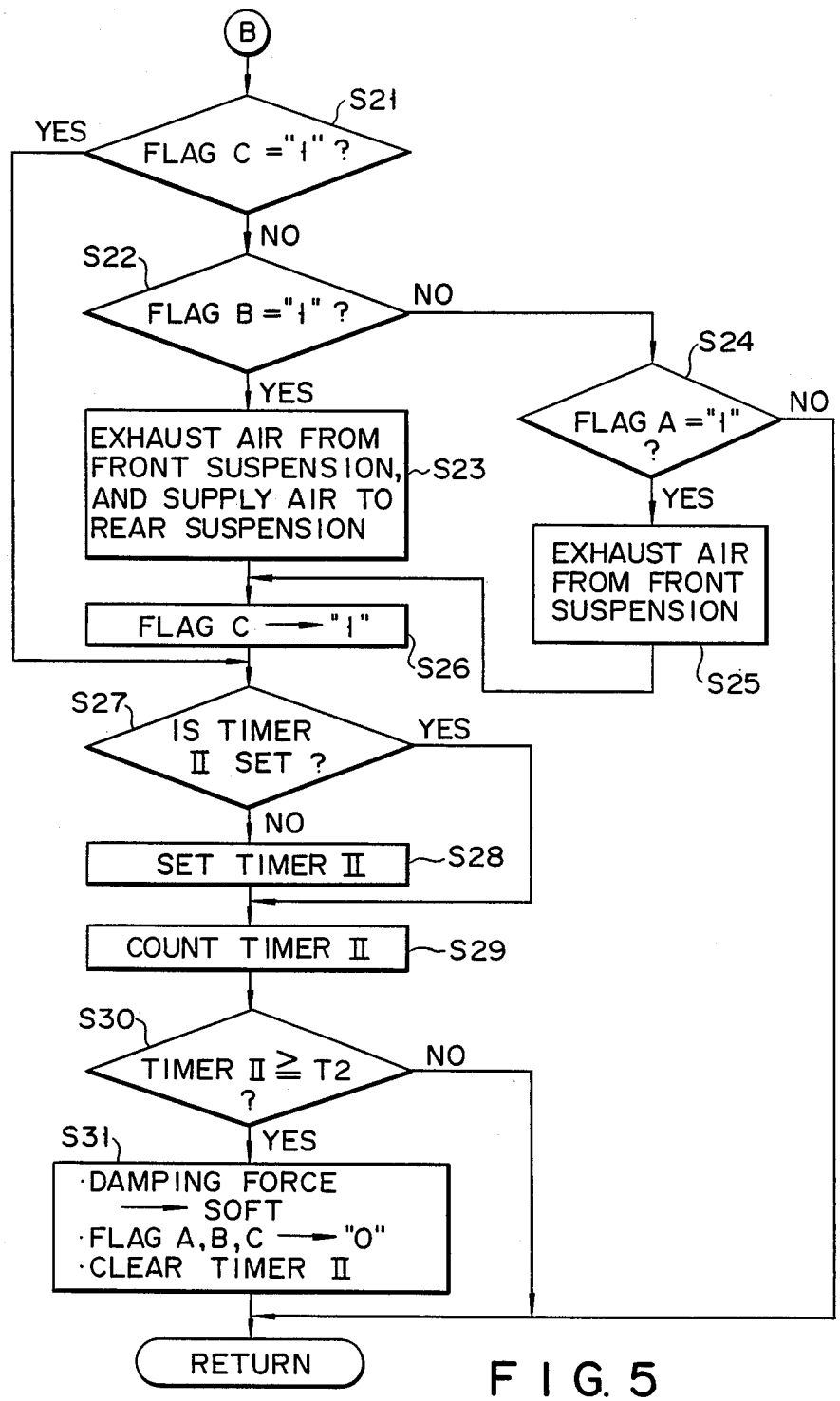

If "NO" is obtained in step S9, i.e., the deceleration is smaller than first set value G1 even though the brake pedal is depressed, or "NO" is obtained in step S17, i.e., the absolute value of the deceleration G is smaller than third set value G3 after processing in one of steps S11, S15, and S16 is executed, the flow advances to a sequence of executing control for recovering the executed control, which is shown in the flow chart of FIG. 5.

In step S21, control unit 36 judges whether internal flag C is "1" or not. If "NO" is obtained in step S21, the flow advances to step S22, and whether flag B is "1" is judged. If "YES" is obtained in step S22, i.e., processing in step S15 or S16 is executed, the flow advances to step S23, and unit 36 outputs a control signal to open front-wheel solenoid valves 22 and 23 for a set control time (e.g., 0.1 second) and open rear-wheel supply valve 24 for a set control time (e.g., 0.1 second), thereby setting the amount of air in each air spring chamber 3 of front- and rear-wheel suspension units FS1, FS2, RS1, and RS2 to a value prior to the control.

If "NO" is obtained in step S22, the flow advances to step S24, and whether flag A is "1" is judged. If "YES" is obtained in step S24, i.e., only processing in step S11 is executed without executing processing in both steps S15 and S16, the flow advances to step S25, and unit 36 outputs a control signal to open valves 22 and 23 for a set control time (e.g., 0.1 second), thereby setting the amount of air in each air spring chamber 3 of suspension units FS1 and FS2 to a value prior to the control. Note that if "NO" is obtained in step S24, i.e., no processing in steps S11, S15, and S16 is executed, the flow returns to step S2 again.

When processing in step S23 or S25 is executed, the flow advances to step S26, flag C is set at "1". When processing in step S26 is completed, the flow advances to step S27, and whether timer II incorporated in unit 36 is set is judged. If "NO" is obtained in step S27, the flow advances to step S28, and timer II is set. In step S29, timer II is incremented. Note that if "YES" is obtained in step 27, the flow advances to step S29. When processing in step S29 is executed, the flow advances to step S30, and whether the count value of timer II exceeds set time T2 (e.g., two seconds) is judged. If "YES" is obtained in step S30, the flow advances to step S31, and unit 36 outputs a control signal to each actuator 6 so as to decrease the damping force to an initial value, and sets flags A and B at "0" and clears timer II. Note that if "YES" is obtained in step S21, the flow advances to step S27.

As is apparent from the above description, according to the embodiment, when an absolute value of a deceleration exceeds first set value G1 within set time T1 after the brake pedal is depressed, a set amount of air is supplied to air spring chambers 3 of front-wheel suspension units FS1 and FS2. When set time T1 has elapsed and the absolute value of the deceleration exceeds second set value G2, a set amount of air is exhausted from air spring chambers 3 of rear-wheel suspension units RS1 and RS2. Accordingly, two-stage control is performed with respect to a braking action for gradually increasing a deceleration, thereby greatly reducing uncomfortableness which passengers feel when anti-nose-dive control is performed. In addition, when the absolute value of the deceleration G is smaller than first set value G1 even though the brake pedal is depressed, the above control is not executed. Even if the absolute value of the deceleration G exceeds first set value G1 upon depression of the brake pedal, when the timing of exceeding the first set value G1 comes after set time T1 has elapsed, it is judged that a slow braking action is performed, and only control for increasing a damping force is performed. Furthermore, when the absolute value of the deceleration G is larger than the first set value G1 but smaller than the second set value G2, a set amount of air is supplied to only air spring chambers of front-wheel suspension units FS1 and FS2. Therefore, consumption of compressed air can be reduced, and hence durability of each part can be improved. Moreover, when a deceleration quickly exceeds second set value G2 after the brake pedal is depressed, a set amount of air is supplied to air spring chambers 3 of front-wheel suspension units FS1 and FS2 while a set amount of air is exhausted from air spring chambers 3 of rear-wheel suspension units RS1 and RS2, so that a nose dive in the vehicle body can be sufficiently reduced.

Note that in the above-described embodiment, when one of flags A, B, and C is set at "1", i.e., after the control is executed, a deceleration value in step S17 for judging whether the control is recovered or not is set to be equal to that of the start of the control in step S9. However, a judgment value slightly smaller than judgment value G1 in step S9 can be used as needed.

In addition, in the above embodiment, the deceleration of the vehicle is calculated on the basis of a vehicle velocity detected by vehicle velocity sensor 38. However, in place of sensor 38, a known acceleration sensor may be used.

What is claimed is:
1. A vehicle suspension apparatus, comprising:
front and rear suspensions, each having a fluid spring chamber, for supporting front and rear wheels;
fluid supply means for supplying a fluid to said fluid spring chambers through front- and rear-wheel supply valves;
fluid exhaust means for exhausting the fluid from said fluid spring chambers through front- and rear-wheel exhaust valves;
brake operation detecting means for detecting an operation state of brake operating means;
deceleration detecting means for detecting a deceleration of a vehicle;

fluid spring chamber control means for outputting a first control signal for opening said front-wheel supply valves for a set control time when said brake operation detecting means and said deceleration detecting means detects that said brake operating means is operated and a deceleration exceeds a first set value within a first set time from a timing at which said brake operating means is started, outputting a second control signal for opening said rear-wheel exhaust valves for a set control time when said brake operation detecting means and said deceleration detecting means then detect that while said brake operating means is operated, the deceleration of said vehicle exceeds a second set value which is larger than the first set value, and outputting a third control signal to said front wheel exhaust valves and rear-wheel supply valves so as to return a fluid amount in each of said fluid spring chambers to a value prior to a control operation when said brake operation detecting means detect after the above operation that the brake operating means is set in an inoperative state, or when the deceleration detecting means detect after the above operation that the deceleration of said vehicle becomes smaller than a third set value which is not more than the first set value.

2. An apparatus according to claim 1, further comprising:

a damping force variable type shock absorber arranged in each of said front and rear suspensions;

target damping force setting means for setting a target damping force in accordance with a control target obtained by said deceleration detecting means; and shock absorber control means for changing the damping force of said shock absorber in accordance with the target damping force set by said target damping force setting means.

3. An apparatus according to claim 2, wherein said shock absorber control means increases the damping force of said shock absorber when said fluid spring chamber control means outputs the first or second control signal, and changes the damping force to a state prior to the control operation when said fluid spring chamber control means outputs the third control signal.

4. An apparatus according to claim 1, wherein said vehicle velocity detecting means comprises a vehicle velocity sensor and calculates the deceleration of said vehicle on the basis of a vehicle velocity detected by said vehicle velocity sensor.

5. An apparatus according to claim 1, wherein said deceleration detecting means detects the deceleration of said vehicle by using a sensor for detecting a decelerated state of said vehicle.

* * * * *